(12) United States Patent
Zuo et al.

(10) Patent No.: US 10,254,605 B2
(45) Date of Patent: Apr. 9, 2019

(54) ADVANCED SUPER DIMENSION SWITCH LIQUID CRYSTAL DISPLAY DEVICE AND MANUFACTURING METHOD THEREOF

(71) Applicants: CHENGDU BOE OPTOELECTRONICS TECHNOLOGY CO., LTD., Chengdu, Sichuan (CN); BOE TECHNOLOGY GROUP CO., LTD., Beijing (CN)

(72) Inventors: Xiongcan Zuo, Beijing (CN); Junhwan Lim, Beijing (CN); Junrui Zhang, Beijing (CN)

(73) Assignees: CHENGDU BOE OPTOELECTRONICS TECHNOLOGY CO., LTD., Chengdu, Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 140 days.

(21) Appl. No.: 14/348,388

(22) PCT Filed: May 20, 2013

(86) PCT No.: PCT/CN2013/075884
§ 371 (c)(1),
(2) Date: Mar. 28, 2014

(87) PCT Pub. No.: WO2014/139211
PCT Pub. Date: Sep. 18, 2014

(65) Prior Publication Data
US 2015/0253468 A1    Sep. 10, 2015

(30) Foreign Application Priority Data
Mar. 15, 2013    (CN) .......................... 2013 1 0084506

(51) Int. Cl.
*G02F 1/1335* (2006.01)
*G02F 1/1345* (2006.01)
(Continued)

(52) U.S. Cl.
CPC .... *G02F 1/13458* (2013.01); *G02F 1/133528* (2013.01); *G02F 2001/133334* (2013.01);
(Continued)

(58) Field of Classification Search
CPC ......... G02F 1/133528; G02F 1/133536; G02F 1/136204
See application file for complete search history.

(56) References Cited

U.S. PATENT DOCUMENTS

2007/0177086 A1* 8/2007 Ishitani ............. G02F 1/133528
349/117
2008/0273146 A1* 11/2008 Ohtani ................. G02B 5/3083
349/96
(Continued)

FOREIGN PATENT DOCUMENTS

CN    202159156 U    3/2012
CN    102682918 A    9/2012
(Continued)

OTHER PUBLICATIONS

International Search Report dated May 9, 2013; PCT/CN2013/075884.
(Continued)

*Primary Examiner* — Phu Vu
(74) *Attorney, Agent, or Firm* — Ladas & Parry LLP

(57) ABSTRACT

An advanced super dimension switch (ADS) liquid crystal display device, a first substrate, a second substrate disposed opposite to the first substrate, a first polarizing sheet attached onto the first substrate, and a second polarizing sheet attached onto the second substrate; the ADS liquid crystal
(Continued)

display device further comprises a graphene film, and the graphene film is provided within the second polarizing sheet. Further disclosed is a method of manufacturing an ADS liquid crystal display device.

2 Claims, 1 Drawing Sheet

(51) Int. Cl.
*G02F 1/1333* (2006.01)
*G02F 1/1343* (2006.01)

(52) U.S. Cl.
CPC ............ *G02F 2001/134381* (2013.01); *G02F 2201/50* (2013.01); *G02F 2202/28* (2013.01); *G02F 2202/36* (2013.01)

(56) References Cited

U.S. PATENT DOCUMENTS

| | | | | |
|---|---|---|---|---|
| 2011/0083790 A1* | 4/2011 | Kimura | ................... | B32B 41/00 156/64 |
| 2012/0257151 A1* | 10/2012 | Teramoto | .......... | G02F 1/133512 349/106 |
| 2012/0261167 A1 | 10/2012 | Sung | | |
| 2012/0266450 A1 | 10/2012 | Jang et al. | | |
| 2013/0071060 A1* | 3/2013 | Kim | ......................... | G02B 6/00 385/11 |
| 2013/0215068 A1* | 8/2013 | Jeon | ........................ | G06F 3/044 345/173 |
| 2015/0146145 A1* | 5/2015 | Zhong | ............... | G02F 1/133514 349/106 |

FOREIGN PATENT DOCUMENTS

| | | |
|---|---|---|
| CN | 102749745 A | 10/2012 |
| KR | 20110031569 A | 3/2011 |
| WO | 2012/124908 A2 | 9/2012 |

OTHER PUBLICATIONS

First Chinese Office Action dated Mar. 25, 2016; Appln. No. 201310084506.0.
International Preliminary Report on Patentability Appln. No. PCT/CN2013/075884; dated Sep. 15, 2013.
Second Chinese Office Action dated Aug. 17, 2016; Appln. No. 201310084506.0.
Third Chinese Office Action dated Feb. 22, 2017; Appln. No. 201310084506.0.

\* cited by examiner

ADVANCED SUPER DIMENSION SWITCH LIQUID CRYSTAL DISPLAY DEVICE AND MANUFACTURING METHOD THEREOF

TECHNICAL FIELD

Embodiments of the present invention relate to an advanced super dimension switch (ADS) liquid crystal display device and a manufacturing method thereof.

BACKGROUND

ADS technology, as a wide-viewing-angle technology using in-plane electric fields, forms a multi-dimensional electric field by combining, in a same plane, electric fields generated at edges of a slit-electrode with electric fields generated between a slit-electrode layer and a plate-like electrode layer, to cause liquid crystal molecules along all orientations, between the slit-electrodes as well as over the electrodes, within a liquid crystal cell to rotate, thereby improving work efficiency of the liquid crystal and increasing light transmission efficiency of the liquid crystal display device.

For a conventional ADS liquid crystal display device as illustrated in FIG. 1, it is necessary to form an ITO thin-film layer 5 on an outer surface of a color filter (CF) substrate 2 through a sputtering process, and connect the ITO thin-film layer 5 to a ground dotting area 7 of a pad region 6 on a thin-film transistor (TFT) substrate 1, by using Ag paste or an electrically-conductive adhesive tape 8; the aim of forming the ITO thin-film layer 5 is to prevent the interference of an external electric field on the ADS electric fields formed within a liquid crystal cell, thereby preventing an abnormal screen-display phenomenon caused by the interference of the external electric field.

However, an ITO thin-film layer used in the conventional ADS technology, due to its relatively high resistivity and poor electrical conductivity, can not satisfactorily shield the interference of an external electric field on the ADS electric fields. In addition, in the conventional ADS technology, to prevent electrostatic discharge (ESD), some electrically-conductive particles may be dispersed in a second polarizing sheet 4 so as to make the polarizing sheet have electrical conducting effect, so that it can also achieve preventing an interference of an external electric field on the ADS electric fields formed within a liquid crystal cell, without the need of additionally coating an ITO thin-film layer; however, because the second polarizing sheet containing electrically-conductive particles has relatively high surface-resistivity and poor electrical conducting performance, it still can not satisfactorily shield the interference of an external electric field with the ADS electric fields.

SUMMARY OF THE INVENTION

The embodiments of the present invention provide an ADS liquid crystal display device and a manufacturing method thereof, to prevent the interference of an external electric field on ADS electric fields, and thus effectively avoid an abnormal screen-display phenomenon caused by the interference of the external electric field.

One aspect of the present invention provides an advanced super dimension switch (ADS) liquid crystal display device, comprising: a first substrate, a second substrate disposed opposite to the first substrate, a first polarizing sheet attached onto the first substrate, and a second polarizing sheet attached onto the second substrate; wherein the ADS liquid crystal display device further comprises a graphene film, and the graphene film is provided within the second polarizing sheet.

For example, the second polarizing sheet comprises in sequence: an adhesive layer, a first supporting protective layer, a polarizer layer, a second supporting protective layer, and a surface-treatment layer; the arrangement that the graphene film is provided within the second polarizing sheet comprises: the graphene film is attached onto any layer of the layers of the second polarizing sheet;

For example, the ADS liquid crystal display device may further comprise Ag paste or an electrically-conductive adhesive tape; the graphene film is connected to a ground dotting area in a pad region on the first substrate by the Ag paste or the electrically-conductive adhesive tape.

Another aspect of the present invention further provides a method of manufacturing an ADS liquid crystal display device, comprising steps as follows: disposing a first substrate and a second substrate opposite to each other; attaching a first polarizing sheet onto the first substrate; and attaching a second polarizing sheet onto the second substrate; wherein a graphene film is provided within the second polarizing sheet.

For example, the step that a graphene film is provided within the second polarizing sheet comprises: attaching the graphene film onto any layer of the layers of the second polarizing sheet by a roll-to-roll process.

For example, the method further comprises a step as follows: connecting the graphene film a ground dotting area in a pad region on the first substrate by Ag paste or an electrically-conductive adhesive tape.

BRIEF DESCRIPTION OF THE DRAWINGS

In order to clearly illustrate the technical solutions of the embodiments of the invention, the drawings of the embodiments will be briefly described in the following; it is obvious that the described drawings are only related to some embodiments of the invention and thus are not limitative of the invention.

REFERENCE NUMERALS

1. TFT substrate; 2. Color filter substrate; 3. First polarizing sheet; 4. Second polarizing sheet; 5. ITO thin-film layer; 6. Pad on the first substrate; 7. Ground dotting area; 8. Ag paste or electrically-conductive adhesive tape; 9. Graphene film; 41. Adhesive layer; 42. First supporting protective layer; 43. Polarizer layer; 44. Second supporting protective layer; 45. Surface-treatment layer.

DETAILED DESCRIPTION OF THE PREFERRED EMBODIMENTS

In order to make objects, technical details and advantages of the embodiments of the invention apparent, the technical solutions of the embodiments will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Unless otherwise defined, technical or scientific terms used herein should be interpreted in the usual sense as understood by those ordinary skilled in the relevant art of the present invention. The terms "first", "second" and the like, used in the specification and claims of this patent application of the invention, do not denote any order, quantity, or importance, but are used to distinguish among different integral parts. Similarly, the words "a", "an", "the" and the like herein do not denote a limitation of quantity, but denote the presence of at least one of the referenced item. The words "comprising," "including" and the like, are referred to that the elements or objects which appear before "comprising" and "including" encompass the elements or objects and their equivalents which are enumerated after "comprising" and "including", and do not exclude other elements or objects. The terms "connection," "joint" or the like, are not limited to physical or mechanical connections, but may comprise electrical connection, whether direct or indirect. The terms "upper", "lower", "left", "right" and the like are only used to indicate a relative positional relationship, which may be changed along with a change in an absolute position of a described object.

Figure 1:
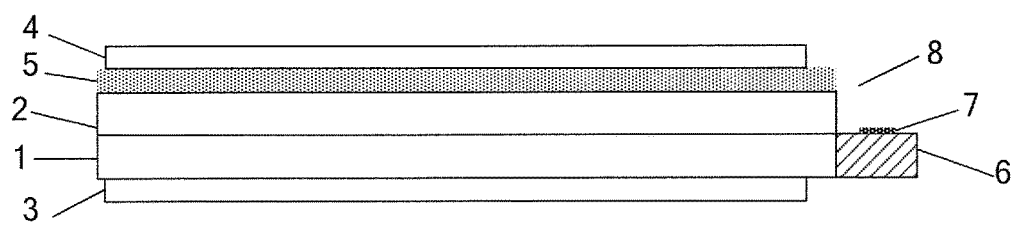
FIG. 1 is a schematic structural view of an ADS liquid crystal display device in a conventional technology.
Figure 2:
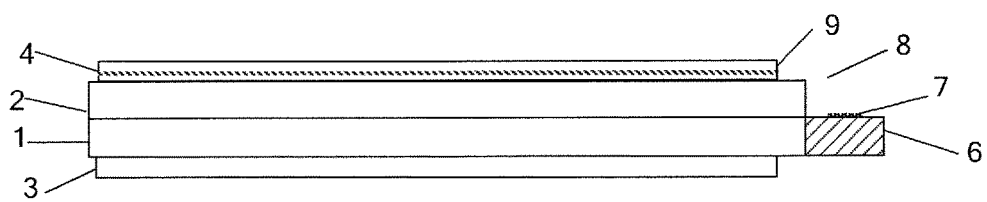
FIG. 2 is a schematic structural view of an ADS liquid crystal display device of the present invention.

FIG. 2 is a schematic structural view of an ADS liquid crystal display device of the present invention. As illustrated in FIG. 2, the ADS liquid crystal display device comprises: a first substrate 1, a second substrate 3 disposed opposite to the first substrate 1, a first polarizing sheet 3 attached onto the first substrate 1, and a second polarizing sheet 4 attached onto the second substrate 3. The first substrate 1 and the second substrate 3 are disposed opposite to each other to form a liquid crystal cell, and the liquid crystal cell is filled therein with a liquid crystal material.

The ADS liquid crystal display device further comprises a graphene film 9, and the graphene film 9 is provided within the second polarizing sheet 4. Graphene is a transparent and well-conductive material, which is commercially available in the market. Currently, methods of preparing graphene include a chemical vapor deposition method, a hydrazine reduction method, etc.

In this embodiment, the first substrate is a TFT substrate (also referred to as an array substrate) 1, and the second substrate is a counter substrate 2, for example, a color filter substrate 2. The TFT substrate comprises a circuit section for driving respective pixels of the liquid crystal display device; where the counter substrate 2 is a color filter substrate, the color filter substrate comprises for example RGB filters in order to achieve color display.

Figure 3:
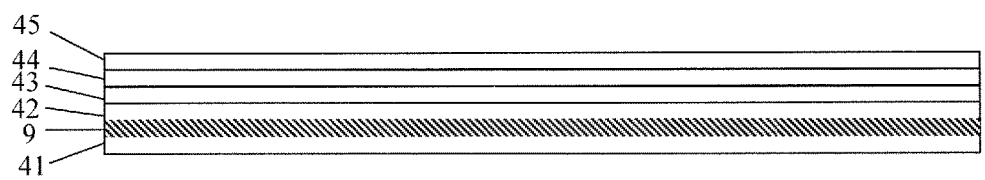
FIG. 3 is a schematic compositional and structural view of an embodiment of a second polarizing sheet of the present invention.

Here, as illustrated in FIG. 3, an example of the second polarizing sheet 4 comprises, in sequence from bottom to top: an adhesive layer (e.g. a polysulphone-amide (PSA) layer or ethylenevinyl acetate copolymer (EVA)) 41, a first supporting protective layer (e.g. a first triacetyl cellulose (TAC) layer) 42, a polarizer layer (e.g. a polyvinyl alcohol (PVA) layer) 43, a second supporting protective layer (a second TAC layer) 44, and a surface-treatment layer 45.

The adhesive layer 41 is used to bond onto a substrate surface (e.g. a glass surface). The surface-treatment layer 45 may be, for example, an anti-reflection (AR) layer, an anti-glare (AG) layer or a surface-hardened layer. Before the second polarizing sheet is bonded to a substrate surface, the adhesive layer 41 usually has a peelable layer affixed thereon for protecting the adhesive layer 41; the peelable layer can be peeled off from the adhesive layer, as needed.

The graphene film 9 is provided within the second polarizing sheet 4, and the graphene film 9 may be provided on any layer of the aforementioned respective layers of the second polarizing sheet 4, for example, on the adhesive layer 41 or on the second supporting protective layer 44.

The ADS liquid crystal display device further comprises Ag paste or an electrically-conductive adhesive tape 8; the graphene film 9 is connected to a ground dotting area 7 in a pad region on the TFT substrate by the Ag paste or the electrically-conductive adhesive tape 8.

FIG. 3 is a schematic compositional and structural view of an example of the second polarizing sheet of the present invention; in this example, the second polarizing sheet 4 comprises in sequence: an adhesive layer 41, a graphene film 9 formed on the adhesive layer 41, a first supporting protective layer 42, a polarizer layer 43, a second supporting protective layer 44, and a surface-treatment layer 45.

It should be noted, the schematic compositional and structural view, given by FIG. 3, are merely an optional scheme of the present invention, but not for limiting the structure of the present invention, and in practice, the graphene film may be attached onto any layer within the second polarizing sheet, for example, on at least one layer.

Compared to a conventional ADS liquid crystal display device, the ADS liquid crystal display device provided by the present invention, by providing a graphene film attached onto a polarizing sheet so as to make the polarizing sheet have electrical conduction effect, can thus achieve the effect of preventing the interference of an external electric field on ADS electric fields, without additionally coating an ITO thin-film layer, thereby preventing an abnormal screen-display phenomenon caused by the interference of the external electric field; moreover, because the graphene film adopted in the present invention has low resistivity and excellent electrical conduction performance, thus it can better prevent the interference of an external electric field on ADS electric fields; meanwhile, the graphene film is a transparent thin-film and will not affect optical properties of ADS display.

An embodiment of the present invention further provides a method of manufacturing an ADS liquid crystal display device as described above, and the method comprises steps as follows: a TFT substrate 1 and a counter substrate (e.g. a color filter substrate) 2 are disposed opposite to each other to form a liquid crystal cell, for example the two substrates are bonded together by sealant, and the liquid crystal cell is filled therein with a liquid crystal material; a first polarizing sheet 3 is attached onto the TFT substrate 1; a second polarizing sheet 4 is attached onto the color filter substrate 2. The method further comprises a step as follows: a graphene film 9 is provided within the second polarizing sheet 4.

Here, the second polarizing sheet 4 comprises in sequence: an adhesive layer 41, a first supporting protective layer 42, a polarizer layer 43, a second supporting protective layer 44, and a surface-treatment layer 45; the step that a graphene film is provided within the second polarizing sheet is: the graphene film 9 is attached onto any layer of the layers of the second polarizing sheet 4, for example on at least one layer, by a roll-to-roll process. For example, during the preparation of the second polarizing sheet, graphene-containing suspension or slurry is coated on an already-prepared layer within the second polarizing sheet, and then dried to obtain a graphene film; thereafter the rest layers within the second polarizing sheet are prepared on the graphene film.

The ADS liquid crystal display device may further comprise Ag paste or an electrically-conductive adhesive tape 8;

accordingly, the method further comprises a step as follows: the graphene film 9 is connected to a ground dotting area 7 in a pad region on the TFT substrate, by the Ag paste or the electrically-conductive adhesive tape 8.

The above are merely exemplary implementations of the present invention, but not for limiting the scope of the invention; instead, the scope of the invention should be defined by the appended claims.

The invention claimed is:

1. A method of manufacturing an advanced super dimension switch (ADS) liquid crystal display device, comprising steps as follows:
    disposing a first substrate and a second substrate opposite to each other;
    attaching a first polarizing sheet onto the first substrate; and
    attaching a second polarizing sheet onto the second substrate;
    wherein a graphene film is provided within the second polarizing sheet,
    the method further comprising a step as follows: connecting the graphene film a ground dotting area in a pad region on the first substrate by Ag paste or an electrically-conductive adhesive tape,
    wherein the second polarizing sheet comprises in sequence: an adhesive layer, a first supporting protective layer, a polarizer layer, a second supporting protective layer, and a surface-treatment layer, and
    wherein the first substrate is an array substrate and the second substrate is a color filter substrate, and
    the step that a graphene film is provided within the second polarizing sheet comprises: during preparing the second polarizing sheet, coating graphene-containing suspension or slurry on any one of the adhesive layer, the first supporting protective layer, the polarizer layer and the second supporting protective layer, then drying the suspension or slurry to obtain a graphene film, and then preparing the remaining layer of the second polarizing sheet on the graphene film.

2. The method according to claim 1, wherein the second polarizing sheet is directly attached to a surface of the color filter substrate facing away from the array substrate.

* * * * *